US011167619B2

United States Patent
Zemsch et al.

(10) Patent No.: US 11,167,619 B2
(45) Date of Patent: Nov. 9, 2021

(54) ASSEMBLY AND METHOD FOR INTRODUCING AIR INTO A PASSENGER COMPARTMENT OF A VEHICLE

(71) Applicant: Bayerische Motoren Werke Aktiengesellschaft, Munich (DE)

(72) Inventors: Stefan Zemsch, Munich (DE); Ingolf Hoerschler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 298 days.

(21) Appl. No.: 15/958,087

(22) Filed: Apr. 20, 2018

(65) Prior Publication Data

US 2018/0236844 A1 Aug. 23, 2018

Related U.S. Application Data

(63) Continuation of application No. PCT/EP2016/074660, filed on Oct. 14, 2016.

(30) Foreign Application Priority Data

Oct. 23, 2015 (DE) ..................... 10 2015 220 739.0

(51) Int. Cl.
*B60H 1/00* (2006.01)
*B60H 1/34* (2006.01)

(52) U.S. Cl.
CPC ....... *B60H 1/00871* (2013.01); *B60H 1/3414* (2013.01); *B60H 1/3457* (2013.01)

(58) Field of Classification Search
CPC ............. B60H 1/00871; B60H 1/3414; B60H 1/3457

(Continued)

(56) References Cited

U.S. PATENT DOCUMENTS

2008/0003938 A1   1/2008 Baruschke et al.
2013/0344791 A1*  12/2013 Wang ................. B60H 1/00828
                                                              454/155

(Continued)

FOREIGN PATENT DOCUMENTS

CN      104802615 A      7/2015
CN      204674338 U      9/2015
DE  20 2005 009 499 U1   8/2005

(Continued)

OTHER PUBLICATIONS

German Search Report issued in counterpart German Application No. 10 2015 220 739.0 dated Apr. 19, 2016 with partial English-language translation (Fifteen (15) pages.

(Continued)

*Primary Examiner* — Vivek K Shirsat
(74) *Attorney, Agent, or Firm* — Crowell & Moring LLP

(57) ABSTRACT

An assembly for introducing air into a passenger compartment of a vehicle is provided. The assembly includes at least three mutually spaced air channels which can be provided with air and each of which has an air outlet. Each air channel is fluidly communicatively connected to the passenger compartment via the air outlets, and an open jet can exit from the outlet. The assembly also includes at least one controller, with which a mass flow of an air flow in each air channel can be controlled. The air outlets are designed and oriented relative to one another such that open jets exiting simultaneously from at least two air outlets can be mixed together in the passenger compartment so as to form a single total air flow. To provide an improved possibility of introducing air into a passenger compartment of a vehicle, the controller is designed to control the mass flow of the air flow in each air channel such that a main flow direction of the total air flow can be spatially varied.

3 Claims, 3 Drawing Sheets

(58) Field of Classification Search
USPC .................................... 454/154, 152, 71, 76
See application file for complete search history.

(56) References Cited

U.S. PATENT DOCUMENTS

| | | | |
|---|---|---|---|
| 2014/0273785 A1* | 9/2014 | Guillory | B60H 1/00378 |
| | | | 454/75 |
| 2014/0357178 A1 | 12/2014 | Doll et al. | |
| 2015/0126104 A1 | 5/2015 | Ooes | |
| 2016/0375941 A1* | 12/2016 | Thompson | B60H 1/00564 |
| | | | 296/190.09 |

FOREIGN PATENT DOCUMENTS

| | | |
|---|---|---|
| DE | 10 2005 002 062 A1 | 9/2005 |
| DE | 10 2013 209 430 B3 | 9/2014 |
| DE | 10 2013 210 053 B3 | 9/2014 |
| EP | 1 972 475 A1 | 9/2008 |
| JP | 11-105529 A | 4/1999 |

OTHER PUBLICATIONS

International Search Report (PCT/ISA/210) issued in PCT Application No. PCT/EP2016/074660 dated Feb. 7, 2017 with English-language translation (Five (5) pages).
German-language Written Opinion (PCT/ISA/237) issued in PCT Application No. PCT/EP2016/074660 dated Feb. 7, 2017 (Five (5) pages).
English translation of Chinese-language Office Action issued in Chinese Application No. 201680054753.8 dated Mar. 24, 2020 (10 pages).

* cited by examiner

ASSEMBLY AND METHOD FOR INTRODUCING AIR INTO A PASSENGER COMPARTMENT OF A VEHICLE

CROSS REFERENCE TO RELATED APPLICATIONS

This application is a continuation of PCT International Application No. PCT/EP2016/074660, filed Oct. 14, 2016, which claims priority under 35 U.S.C. § 119 from German Patent Application No. 10 2015 220 739.0, filed Oct. 23, 2015, the entire disclosures of which are herein expressly incorporated by reference.

BACKGROUND AND SUMMARY OF THE INVENTION

The invention relates to an assembly for introducing air into a passenger compartment of a vehicle. The assembly includes at least three air ducts that are disposed so as to be mutually spaced apart and are capable of being supplied with air. Each air duct has an air outlet by way of which the respective air duct is connected in a fluidly communicating manner with the passenger compartment and from which an open jet can exit. The assembly includes at least one control installation by way of which a mass flow of an air flow is controllable in each of the air ducts. The air outlets are configured and mutually aligned in such a manner that open jets that exit simultaneously from at least two air outlets in the passenger compartment are capable of being mixed with one another to form a single total air flow.

The invention furthermore relates to a method for introducing air into a passenger compartment of a vehicle, wherein at least three open jets are introduced into the passenger compartment in such a manner that the open jets in the passenger compartment are mixed with one another to form a single total air flow.

Air vents by way of which air is capable of being introduced into a passenger compartment of a vehicle are known. To this end, an air vent is supplied with air by way of a blower and an air supply duct that is disposed between the air vent and the blower. An air vent typically offers different setting possibilities. For example, a flow direction of an air jet that flows from an air vent can be set. To this end, the air vent can be equipped with a lamella construction, in particular a lamella grill, which by way of pivotable lamellas, or a lamellas that are displaceable in another manner, enables a variable deflection of the air.

A lamella construction is a mechanical construction with fine details which is relatively complex both in production as well as in assembly and is thus expensive. Moreover, the lamellas act as aerodynamic resistance elements or obstacles, respectively, in the air flow. As compared with an unimpeded air flow, this as a consequence has both an increased loss in terms of flow and pressure, as well as a significant deterioration of the acoustics by way of the creation of noise. A deflection of the flow is relatively limited at large angular positions by way of a physically caused release of the flow at the lamellas.

An air vent is known from DE 10 2013 210 053 B3. Said air vent have three air ducts that are disposed so as to be mutually spaced apart and are capable of being supplied with air. The air ducts can each have one air outlet by way of which the respective air duct is connected in a fluidly communicating manner with a passenger compartment of a vehicle, and from which an open jet can exit. The air vent includes flaps which are individually assigned to the air ducts and by way of which a mass flow of an air flow is controllable in the respective air duct. The air vents of the air ducts are configured and mutually aligned in such a manner that open jets that exit simultaneously from at least two air outlets in the passenger compartment are capable of being mixed with one another to form a single total air flow. By controlling the mass flows of the air flows in the individual air ducts, a main alignment of the total air flow generated can be varied in a vertical plane such that no conventional lamellas have to be used to this end. In order for the main direction of the total air flow generated to be varied in a horizontal plane, the air vent includes further flaps which are formed by an adjustable lamella construction. The further flaps are disposed in an air entry region of the air vent.

It is an object of the invention to achieve an improved possibility for introducing air into a passenger compartment of a vehicle.

This and other objects are achieved by an assembly and/or a method for introducing air into a passenger compartment of a vehicle in accordance with embodiments of the invention.

An assembly according to an embodiment of the invention for introducing air into a passenger compartment of a vehicle includes at least three air ducts that are disposed so as to be mutually spaced apart and are capable of being supplied with air. Each air duct has an air outlet by way of which the respective air duct is connected in a fluidly communicating manner with the passenger compartment and from which an open jet can exit. The assembly according to the embodiment of the invention furthermore includes at least one control installation by way of which a mass flow of an air flow is controllable in each of the air ducts. The air outlets are configured and mutually aligned in such a manner that open jets that exit simultaneously from at least two air outlets in the passenger compartment are capable of being mixed with one another to form a single total air flow. According to the embodiment of the invention, the control installation is specified for controlling the mass flow of the air flow in each of the air ducts in such a manner that a main flow direction of the total air flow is variable in spatial terms.

According to an embodiment of the invention, the main flow direction of the total air flow can be varied in spatial terms without the use of lamellas, that is to say in two planes that are disposed so as to be mutually perpendicular. In the case of an air vent according to DE 10 2013 210 053 B3, this is possible only in one plane, in particular in the vertical plane, whereas an adjustable lamella construction is used for varying the main flow direction of the total air flow in the horizontal plane. Since the assembly according to the embodiment of the invention thus makes do without a lamella construction of this type, the assembly according to the invention is producible with less complexity and thus in a more cost-effective manner than conventional air vents having movable lamellas. Since there are no lamellas or aerodynamic obstacles, respectively, in the air flow in the case of the assembly according to the invention, an increased loss in terms of flow and pressure, and a deterioration of the acoustics by a creation of noise when the flow passes around the lamellas, do not arise as is the case hitherto. The assembly according to the invention, due to dispensing with movable lamellas and with the associated finely detailed mechanism for adjusting the lamellas, is significantly more robust and functionally more reliable than a conventional air vent having movable lamellas. On account thereof, the amount of potentially required repair work can be significantly reduced. The omission of movable lamellas according to the invention moreover leads to greater freedoms in the design of the assembly according to the invention and of a component to which the air outlets of the air ducts of the assembly are attached. In particular, the application of the air outlets of the air ducts is not restricted to a specific component, in particular a vehicle component, such that a high flexibility is provided in terms of the selectable positions of the air outlets. For example, a design component or display can be disposed between the air outlets of the air ducts that are disposed so as to be mutually spaced apart. Moreover, the air outlets of the air ducts can be disposed in such a manner that said air outlets are largely invisible to a vehicle occupant and thus do not downgrade the visual impression that is created for an observer of a component on which the air outlets are disposed. On account of the omission of movable lamellas in the air exit region of the assembly according to the invention, the latter is moreover imparted an appeal of higher quality and higher aesthetics.

The control installation of the assembly according to an embodiment of the invention can have movable control elements, for example control flaps or the like, which each are assigned to one of the air ducts so as to be able to control the mass flow of the air flow in the respective air duct, in a manner corresponding to the respective position of the control element. The control installation by way of a blower can be supplied with air which by way of the control installation is distributed to the air ducts. Alternatively, the control installation can have a dedicated electrically actuatable blower for each air duct and the respective air duct is capable of being supplied with air by way of said blower. The control installation can be activated by a user by way of a manual operating unit which can have, for example, at least one rotary switch, at least one toggle switch, at least one push-button switch, or a touchscreen, or by way of speech, gestures, or eye tracking, so as to be able to adjust the type and the extent of the introduction of air as desired by way of the assembly according to the invention. The operating unit can be connected to the control installation in terms of signal technology or in mechanical terms.

The assembly according to an embodiment of the invention can be used for directly introducing temperature-controlled and/or dried air into a passenger compartment of a vehicle. The assembly according to the embodiment of the invention enables in particular the total air flow to be adapted in an optimal manner to significantly changed seating positions in which, for example, a seat has been rotated and displaced about a vertical axis.

According to one advantageous design embodiment, the assembly includes four air ducts that are disposed so as to be mutually spaced apart and are capable of being supplied with air. Each air duct has an air outlet by way of which the respective air duct is connected in a fluidly communicating manner with the passenger compartment and from which an open jet can exit. A mass flow of an air flow in each of the air ducts is controllable by way of the control installation. The air outlets are configured and mutually aligned in such a manner that open jets that exit simultaneously from at least two air outlets in the passenger compartment are capable of being mixed with one another to form a single total air flow. The control installation is specified for controlling the mass flow of the air flow in each of the air ducts in such a manner that a main flow direction of the total air flow is variable in spatial terms. The assembly can also have more than four respective air ducts, having in particular air ducts that are disposed in pairs.

According to a further advantageous design embodiment, the control installation is specified for controlling the mass flow of the air flow in each of the air ducts during the introduction of the air into the passenger compartment in such a manner that the main flow direction of the total air flow is varied in a temporally periodic manner. On account thereof, the main flow direction of the total air flow can be moved, for example, along a predefined path having a profile that is configured so as to be linear, circular or helical, or in another manner. The total air flow, by way of a movement of the main flow direction of the total air flow in a temporally periodic manner along a path that is configured so as to be linear, can be moved in fawning back-and-forth manner in one plane. In the case of a movement of the main flow direction of the total air flow in a temporally periodic manner along a path that is configured so as to be helical, the total air flow can attenuate in the direction of an occupant located in the passenger compartment such that no unpleasant feeling of a draft is caused for the occupant. The total air flow, by way of a movement of the main flow direction of the total air flow in a temporally periodic manner along a path that is configured so as to be circular or in another two-dimensional manner, can be fanned out, so to speak, so as not to be directed continuously toward a specific point, which could trigger an unpleasant feeling of a draft for an occupant.

According to a further advantageous design embodiment, the air ducts are mutually aligned so as to be inclined in such a manner that the total air flow that is formed in the passenger compartment from the open jets that exit simultaneously from at least two air outlets has a swirl. By way of the swirl, an occupant in the passenger compartment can be exposed indirectly to the total air flow, and this is perceived to be more pleasant. To this end, the air ducts can be disposed so as to be tangentially tilted.

According to one alternative further advantageous design embodiment, the assembly includes at least three additional air ducts that are disposed so as to be mutually spaced apart and are capable of being supplied with air. Each additional air duct has an additional air outlet by way of which the respective additional air duct is connected in a fluidly communicating manner with the passenger compartment and from which an open jet can exit. A mass flow of an air flow in each of the additional air ducts is controllable by way of the control installation. The additional air ducts are configured and mutually aligned so as to be inclined in such a manner that open jets that exit simultaneously from at least two additional air outlets in the passenger compartment are capable of being mixed with one another to form a single total air flow which has a swirl. The air ducts and the additional air ducts can be used alternatively or additionally in order for the air to be introduced into the passenger compartment. In particular, the air ducts can be used for a direct incident flow to an occupant of the passenger compartment, and the additional air ducts can be used for an indirect incident flow to the occupant. If required, switching back and forth between a direct and an indirect incident flow can thus take place. To this end, the additional air ducts can be disposed so as to be tangentially tilted.

One further advantageous design embodiment provides that at least two air ducts are disposed so as to be pivotable in a two-dimensional or three-dimensional manner. Three or more, in particular all, air ducts can also be disposed so as to be pivotable in an analogous manner. For example, a total air flow having a swirl, by way of which an occupant of the passenger compartment is exposed to an incident flow, can be generated by way of the pivotability of the air ducts. In particular, switching back and forth between a direct and an indirect incident flow to the occupant can take place by way of the pivotability of the air ducts. Moreover, the spacing between a mixing location, where the open air jets are mixed with one another to form the total air flow, and the air outlets can be varied by way of the pivotability of the air ducts. For example, the mixing location can be close to a dashboard of a motor vehicle. On account thereof, an instability in terms of the jet, which can be utilized for configuring a fawning function in which the total air flow is periodically moved back and forth in one plane, can be generated. Alternatively, the open air jets can be directed directly toward an occupant of the passenger compartment. Electrically actuatable actuators can be present for pivoting the air ducts. Alternatively, the pivoting of the air ducts can be performed by way of a mechanism that can be manually operated.

According to a method according to an embodiment of the invention for introducing air into a passenger compartment of a vehicle, at least three open jets are introduced into the passenger compartment in such a manner that the open jets in the passenger compartment are mixed with one another to form a single total air flow. The mass flow of each open jet is controlled in such a manner that a main flow direction of the total air flow is variable in spatial terms.

The advantages that have been mentioned above in the context of the assembly are associated in an analogous manner with the method. In particular, the assembly for carrying out the method can be specified according to one of the aforementioned design embodiments or any arbitrary combination of the latter. The mass flow of each open jet in this instance can be controlled by way of a variation in the mass flow in the respective air duct.

According to one advantageous design embodiment, four open jets are introduced into the passenger compartment in such a manner that the open jets in the passenger compartment are mixed with one another to form a single total air flow. The mass flow of each open jet is controlled in such a manner that a main flow direction of the total air flow is variable in spatial terms. The advantages that have been mentioned above in the context of the respective design embodiment of the assembly are associated in an analogous manner with this design embodiment.

According to one further advantageous design embodiment, the mass flow of the open jets during the introduction of the air into the passenger compartment is controlled in such a manner that the main flow direction of the total air flow is varied in a temporally periodic manner. The advantages that have been mentioned above in the context of the respective design embodiment of the assembly are associated in an analogous manner with this design embodiment.

One further advantageous design embodiment provides that the main flow direction of the main air flow is varied in such a temporally periodic manner that the main flow direction is moved along a predefined path having a profile that is configured so as to be circular or helical or in another manner. The advantages that have been mentioned above in the context of the respective design embodiment of the assembly are associated in an analogous manner with this design embodiment.

According to one further advantageous design embodiment, open jets are introduced into the passenger compartment in such a manner that the total air flow has a swirl. The advantages that have been mentioned above in the context of the respective design embodiment of the assembly are associated in an analogous manner with this design embodiment. Air ducts or additional air ducts such as those that have been described above can be used for generating the total air flows.

One further advantageous design embodiment provides that the open jets are introduced into the passenger compartment by way of air outlets, wherein a spacing between a mixing location at which the open jets are mixed with one another to form the total air flow and the air outlets is varied. The advantages that have been mentioned above in the context of the respective design embodiment of the assembly are associated in an analogous manner with this design embodiment.

Other objects, advantages and novel features of the present invention will become apparent from the following detailed description of one or more preferred embodiments when considered in conjunction with the accompanying drawings.

DETAILED DESCRIPTION OF THE DRAWINGS

The same, or functionally equivalent, components are provided with the same reference signs in the figures.

Figure 1:
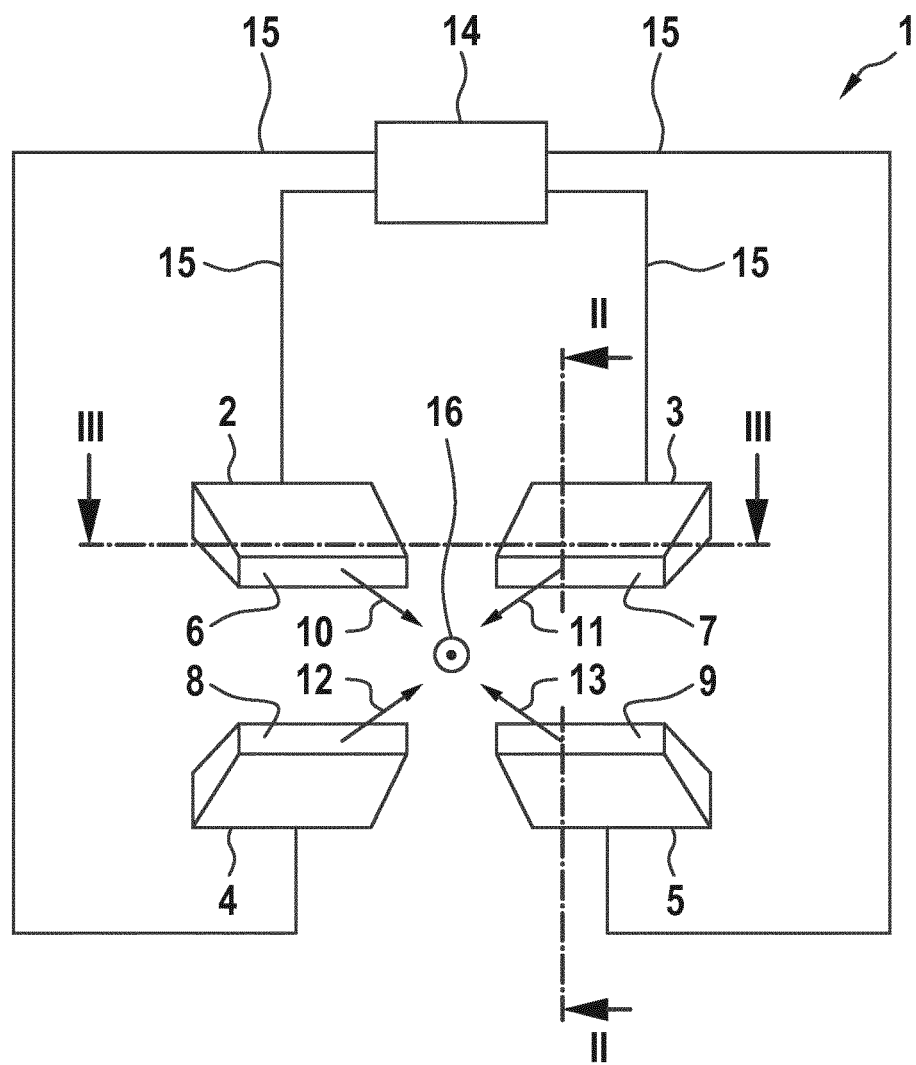
FIG. 1 is a schematic illustration of an exemplary embodiment of an assembly according to the invention.

FIG. 1 shows a schematic illustration of an exemplary embodiment of an assembly 1 according to the invention, for introducing air into a passenger compartment (not shown) of a vehicle.

The assembly 1 includes four schematically indicated air ducts 2, 3, 4, and 5 that are disposed so as to be mutually spaced apart and are capable of being supplied with air. Each air duct 2, 3, 4, or 5, respectively, includes one air outlet 6, 7, 8, or 9, respectively, by way of which the respective air duct 2, 3, 4, or 5, respectively, is connected in a fluidly communicating manner with the passenger compartment and from which an open jet 10, 11, 12, or 13, respectively, that is indicated by an arrow can exit. The air ducts 2 and 3 and the air ducts 4 and 5 are disposed so as to be horizontally beside one another. The air ducts 2 and 4 and the air ducts 3 and 5 are disposed vertically on top of one another.

The assembly 1 furthermore includes a control installation 14 by way of which a mass flow of an air flow in each of the air ducts 2, 3, 4, and 5 is controllable. To this end, the control installation 14 by way of air supplies 15 is connected in a fluidly communicating manner with the air ducts 2, 3, 4, and 5.

The air outlets 6, 7, 8, and 9 are configured and mutually aligned in such a manner that open jets 10, 11, 12, or 13, respectively, that exit simultaneously from at least two air outlets 6, 7, 8, or 9, respectively, in the passenger compartment are capable of being mixed with one another to form a single total air flow 16 that is indicated by a further arrow.

The control installation 14 is specified for controlling the mass flow of the air flow in each of the air ducts 2, 3, 4, and 5 in such a manner that a main flow direction of the total air flow 16 is variable in spatial terms. This is indicated in particular in FIGS. 2 and 3.

The control installation 14 can be specified for controlling the mass flow of the air flow in each of the air ducts 2, 3, 4, and 5 during the introduction of the air into the passenger compartment in such a manner that the main flow direction of the total air flow 16 is varied in a temporally periodic manner.

Figure 2:
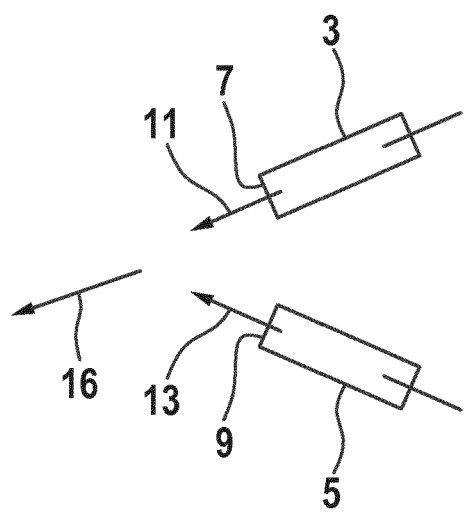
FIG. 2 is a schematic sectional illustration of the assembly shown in FIG. 1.

FIG. 2 shows a schematic sectional illustration of the assembly 1 shown in FIG. 1, so as to correspond to the section plane II-II shown in FIG. 1. The two air ducts 3 and 5 having the respective air outlets 7 and 9 thereof, respectively, are shown. The mass flow of the air flow that is guided in the air duct 3, or the mass flow of the open jet 11, respectively, is greater than the mass flow of the air flow that is guided in the air duct 5, or than the mass flow of the open jet 13, respectively. On account thereof, a total flow 16 is generated, and the main flow direction of the latter is directed downward, as shown in FIG. 2.

Figure 3:
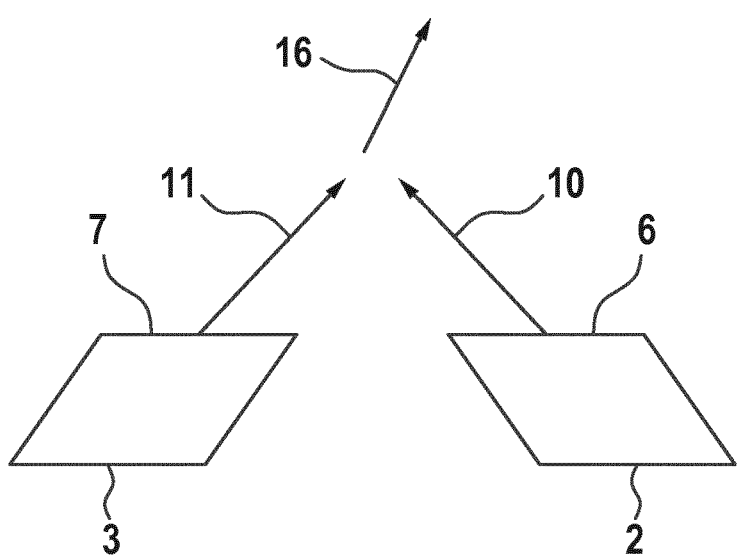
FIG. 3 is a further schematic sectional illustration of the assembly shown in FIG. 1.

FIG. 3 shows a further schematic sectional illustration of the assembly 1 shown in FIG. 1, so as to correspond to the section plane shown in FIG. 1. The two air ducts 2 and 3 having the respective air outlets 6 and 7 thereof, respectively, are shown. The mass flow of the air flow that is guided in the air duct 3, or the mass flow of the open jet 11, respectively, is greater than the mass flow of the air flow that is guided in the air duct 2, or than the mass flow of the open jet 10, respectively. On account thereof, a total flow 16 is generated, the main flow direction of the latter being directed toward one side, as shown in FIG. 3.

Figure 4:
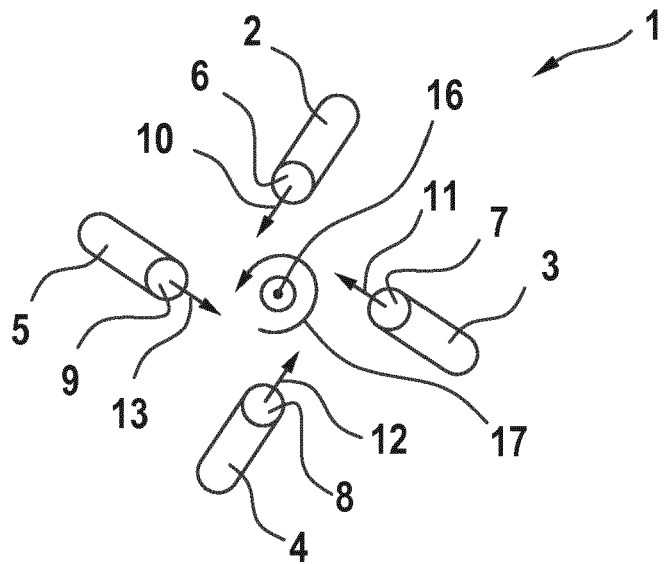
FIG. 4 is a schematic illustration of a further exemplary embodiment of an assembly according to the invention.

FIG. 4 shows a schematic illustration of a further exemplary embodiment of an assembly 1 according to the invention for introducing air into a passenger compartment of a vehicle. Merely four tubular air ducts 2 to 5 of the assembly 1 are shown. The assembly 1 in other aspects can be configured in a manner corresponding to the exemplary embodiment shown in FIGS. 1 to 3, thus reference therefore is made to the description above in order for repetitions to be avoided.

The air ducts 2 to 5 are mutually aligned so as to be inclined in such a manner that the total air flow 16 that is formed in the passenger compartment from the open jets 10, 11, 12, or 13, respectively, that exit simultaneously from at least two air outlets 6, 7, 8, or 9, respectively, has a swirl 17. To this end, the air ducts 2 to 5 are disposed so as to be tangentially tilted.

Alternatively, the air ducts 2 to 5 can be configured as additional air ducts which are provided additionally to further air ducts which can be configured in a manner analogous to the exemplary embodiment shown in FIGS. 1 to 3.

Figure 5:
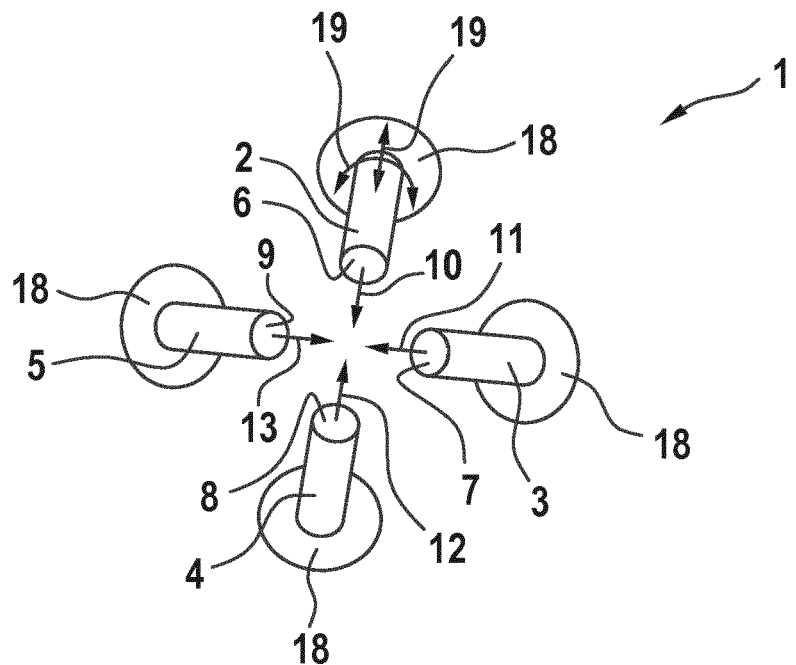
FIG. 5 is a schematic illustration of a further exemplary embodiment of an assembly according to the invention.

FIG. 5 shows a schematic illustration of a further exemplary embodiment of an assembly 1 according to the invention for introducing air into a passenger compartment of a vehicle. In the assembly 1, merely four tubular air ducts 2 to 5 which are in each case by way of a spherical mounting 18 disposed so as to be pivotable in a three-dimensional manner (corresponding to the double arrows 19) are shown. The assembly 1 in other aspects can be configured in a manner corresponding to the exemplary embodiment shown in FIGS. 1 to 3, thus reference therefore is made to the description above in order for repetitions to be avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Assembly
2 Air duct
3 Air duct
4 Air duct
5 Air duct
6 Air outlet of air duct 2
7 Air outlet of air duct 3
8 Air outlet of air duct 4
9 Air outlet of air duct 5
10 Open jet from air outlet 6
11 Open jet from air outlet 7
12 Open jet from air outlet 8
13 Open jet from air outlet 9
14 Control installation
15 Air supply
16 Total air flow
17 Swirl
18 Spherical mounting
19 Double arrow (pivotability)

What is claimed is:

1. An assembly for introducing air into a passenger compartment of a vehicle, the assembly comprising:
at least three air ducts that are disposed so as to be mutually spaced apart and are suppliable with air, each having an air outlet by way of which the respective air duct is connected in a fluidly communicating manner with the passenger compartment and from which an open jet is exitable; and
at least one control installation by way of which a mass flow of an air flow is controllable in each of the air ducts, wherein
the air outlets are configured and mutually aligned in such a manner that open jets that exit simultaneously from at least two air outlets in the passenger compartment are mixable with one another to form a single total air flow from the at least two air outlets,
the control installation is configured to control the mass flow of the air flow in each of the air ducts in such a manner that a main flow direction of the single total air flow from the at least two air outlets is spatially variable in two planes that are disposed so as to be mutually perpendicular,
there is no movable lamella in a respective air exit region of the at least three air ducts,
the control installation is configured to control the mass flow of the air flow in each of the air ducts during the introduction of the air into the passenger compartment in such a manner that the main flow direction of the single total air flow is varied in a temporally periodic manner, and
the main flow direction of the single total air flow is varied in such a temporally periodic manner that the main flow direction is moved along a predefined path having a profile that is configured so as to be circular or helical.

2. The assembly according to claim 1, wherein at least two air ducts are disposed so as to be pivotable in a two-dimensional or three-dimensional manner.

3. A method for introducing air into a passenger compartment of a vehicle, the method comprising the acts of:
introducing at least three open jets from respective air outlets of respective air ducts into the passenger compartment in such a manner that the open jets in the passenger compartment are mixed with one another to form a single total air flow; and
controlling a mass flow of each open jet by a control installation in such a manner that a main flow direction of the single total air flow from the respective air outlets is spatially variable in two planes that are disposed so as to be mutually perpendicular, wherein there is no movable lamella in a respective air exit region of the respective air ducts, wherein the mass flow of the open jets during the introduction of the air into the passenger compartment is controlled in such a manner that the main flow direction of the single total air flow is varied in a temporally periodic manner, and wherein the main flow direction of the single total air flow is varied in such a temporally periodic manner that the main flow direction is moved along a predefined path having a profile that is configured so as to be circular or helical.

* * * * *